(12) United States Patent
Tsuruoka et al.

(10) Patent No.: US 9,641,066 B2
(45) Date of Patent: May 2, 2017

(54) SWITCHING REGULATOR CIRCUIT/PROCESS COUNTING CLOCK CYCLES AFTER REGULATOR COMPARATOR CHANGE

(71) Applicant: Texas Instruments Incorporated, Dallas, TX (US)

(72) Inventors: Naoyuki Tsuruoka, Tokyo (JP); Daijiro Otani, Tokyo (JP); Keita Ikai, Tokyo (JP); Masaki Yamashita, Saitama (JP)

(73) Assignee: Texas Instruments Incorporated, Dallas, TX (US)

( * ) Notice: Subject to any disclaimer, the term of this patent is extended or adjusted under 35 U.S.C. 154(b) by 306 days.

(21) Appl. No.: 13/954,687

(22) Filed: Jul. 30, 2013

(65) Prior Publication Data

US 2014/0055107 A1    Feb. 27, 2014

Related U.S. Application Data

(60) Provisional application No. 61/677,727, filed on Jul. 31, 2012.

(51) Int. Cl.
    *H02M 3/156*      (2006.01)
    *H02M 3/02*      (2006.01)

(52) U.S. Cl.
    CPC .............. *H02M 3/02* (2013.01); *H02M 3/156* (2013.01)

(58) Field of Classification Search
    CPC ................. H02M 3/158; H02M 3/157; H02M 2001/0012; H02M 3/1563
    USPC ..................................................... 323/283, 284
    See application file for complete search history.

(56) References Cited

U.S. PATENT DOCUMENTS

| | | | | |
|---|---|---|---|---|
| 4,837,495 A | * | 6/1989 | Zansky | 323/222 |
| 2007/0228843 A1 | * | 10/2007 | Radley | 307/130 |
| 2009/0160422 A1 | * | 6/2009 | Isobe et al. | 323/349 |
| 2010/0073974 A1 | * | 3/2010 | Zeng et al. | 363/84 |
| 2011/0018515 A1 | * | 1/2011 | McCloy-Stevens | 323/284 |
| 2011/0068761 A1 | * | 3/2011 | Chen et al. | 323/282 |

* cited by examiner

*Primary Examiner* — Gary L Laxton
*Assistant Examiner* — Kyle J Moody
(74) *Attorney, Agent, or Firm* — Lawrence J. Bassuk; Charles A. Brill; Frank D. Cimino

(57) ABSTRACT

A current driver is coupled to an inductor; a digital control for regulation of the current driver turns the current driver on or off coupled to the current driver; a comparator output coupled to the input of the digital control for regulation of the driver with inputs to compare a voltage of the inductor to a target voltage, a digital control for selection of one of a set of peaks and valleys of allowable current levels of the current driver, the digital control for selection of one of a set of peaks and valleys coupled to the output of the comparator and an input of the current driver, the digital control for the peak/valley current to monitor the duration of each high and low output state of the comparator output to determine the selection of one of the set of peak and valley of allowable current levels for the current driver.

5 Claims, 11 Drawing Sheets

SWITCHING REGULATOR CIRCUIT/PROCESS COUNTING CLOCK CYCLES AFTER REGULATOR COMPARATOR CHANGE

PRIORITY

This application claims priority to U.S. Provisional Application No. 61/677,727, filed Jul. 31, 2012, entitled "Adaptive Inductor Peak Current Control on Switching Regulator for Mechanical Noise Reduction", which is incorporated by reference in its entirety.

TECHNICAL FIELD

This application is directed, in general, to inductor current control of a switching regulator, and more particularly, to a control of a switching regulator using staggered thresholds of currents in a feedback loop.

BACKGROUND

FIG. 1A illustrates a prior art switching regulator with a voltage feedback system 100. As is illustrated, a regulator output voltage of a voltage feedback 105 is compared with a target reference voltage 110 by a comparator 120 for voltage regulation. As is illustrated, a voltage feedback path is used through the comparator 120 to drive an on-off digital control 125, which powers a current driver 127, which is itself coupled to an inductor 130.

The system 100 further includes a power supply 129 coupled to the current driver 127. A power supply de-coupling capacitor 129 is also coupled to the current driver 127, the power supply 129, and ground.

In FIG. 1B, a peak current of the inductor 130 is defined as the maximum value during an inductor current charging state. The valley current of the inductor is defined as a minimum allowable value during an inductor current discharging state during a charge/discharge cycle. Please note that, in the prior art, the peak thresholds are set high to support high load current.

As appreciated by the present inventors, in FIG. 1B, the inductor 130 current magnitude settings are fixed by an external control logic, which is not in the control loop.

Moreover, as appreciated by the present inventors, generally, when a load current is constant, the charge/discharge frequency is also constant. However, when the inductor 130 peak current is high, but the load current transitions to low, the switching frequency of the regulator system 100 becomes lower. As appreciated by the present inventors, the fundamental mechanical frequency of vibration of the de-coupling capacitor 128 is a function of the switching frequency of the regulator 100.

If this mechanical vibration occurs in an audible frequency, this creates noise which is unsuitable and undesirable.

For example, if the charge/discharge cycle occurs on a 2 kHz cycle, which can be heard by human ears, which can be a problem.

FIG. 2 illustrates a transient simulation result of the prior art. The load current is gradually swept up in 210 and swept down in 220 of graph 205. The current peak/valley thresholds are always the same.

The load current is illustrated as low in 240. However, the inductor peak current is the same as occurs in the high load current, so that switching frequency of the regulator 100 is low in 240, so therefore the power supply regulator 100 can lead to unwanted noise emanating from the de-coupling capacitor 128.

FIG. 3 illustrates prior art frequency response simulation result. As is illustrated, a spectrum of the power supply current is observed as occurring in an audible frequency range, when the regulator 100 providing a low load current (e.g., as occurs when a device coupled to the regulator output is turned off).

FIG. 4A illustrates a prior art printed circuit board with a power supply de-coupling capacitor 410 to decouple a power supply (not illustrated) to the regulator components 420. Disadvantageously, the capacitor 410 vibrates at the switching frequency of the regulator 100, and hence, if the regulator switching frequency is in an audible frequency, it results in an audible noise.

Therefore, there is a need in the art as understood by the present inventors to have a form of switching regulator control that addresses at least some of the disadvantages of the prior art.

SUMMARY

A first aspect provides an apparatus, comprising: an inductor; a current driver coupled to the inductor; a digital control for regulation of the current driver that turns the current driver on or off coupled to the current driver; a comparator output coupled to the input of the digital control for regulation of the driver, the comparator having inputs to compare a voltage of the inductor to a target voltage, a digital control for selection of one of a set of peaks and valleys of allowable current levels of the current driver, the digital control for selection of one of a set of peaks coupled to the output of the comparator and an input of the current driver, the digital control for the peak/valley current to monitor the duration of each high and low output state of the comparator output to determine the selection of one of the set of peak and valley of allowable current levels for the current driver, a power supply, and a power supply capacitor coupled to current driver and the power supply.

The first aspect can further provide wherein a noise associated with a load current generated as a consequence of the digital control for the peak/valley current controlling the current driver is substantially outside of an audibly discernible range of a human; a timer to monitor an output of the comparator for the digital control, wherein the timer has a variable time value that is programmable, wherein the threshold values of the selected peak/valley for the current driver increase after a certain time of a high output of the comparator has occurred, wherein the threshold values of the selected peak/valley for the current driver decrease after a certain time of a low output of the comparator has occurred, wherein the kilohertz value of a distance between a plurality of peak to the next peak transitions of the inductor current is at least 40 kilohertz, and wherein the power supply is incorporated as part of a buck circuit, a boost circuit, or a buck/boost circuit.

A second aspect provides an apparatus, comprising: an inductor; a current driver coupled to the inductor; a digital control for regulation of the current driver that turns the current driver on or off coupled to the current driver; a comparator output coupled to the input of the digital control for regulation of the driver, the comparator having inputs to compare a voltage of the inductor to a target voltage, a digital control for selection of one of a set of peaks and valleys of allowable current levels of the current driver, the digital control for selection of one of a set of peaks and valleys coupled to the output of the comparator and an input of the current driver, the digital control for the peak/valley current to monitor the duration of each high and low output state of the comparator output to determine the selection of one of the set of peak and valley of allowable current levels for the current driver, a power supply, and a power supply capacitor coupled to current driver and the power supply, wherein the threshold values of the selected peak/valley for the current driver increase after a certain time of a high output of the comparator has occurred, wherein the threshold values of the selected peak/valley for the current driver decrease after a certain time of a low output of the comparator has occurred.

The second aspect can further provide wherein a noise associated with a load current generated as a consequence of the digital control for the peak/valley current controlling the current driver is substantially outside of an audibly discernible range of a human, a timer to monitor an output of the comparator for the digital control, wherein the timer has a variable time value that is programmable, wherein a value between a peak threshold and a valley threshold is adjustable, and wherein the power supply is incorporated as part of a buck circuit, a boost circuit, or a buck/boost circuit.

The third aspect provides a method, comprising: receiving a clock signal; receiving an output of a comparator that compares an inductor voltage to a reference voltage; resetting a timer upon receipt of a transition of the output of the comparator; generating a counter result from the timer; receiving a predetermined count number that sets a limit as to how long a duration is for a selected peak current thresholds; comparing the counter result to the predetermined count number; and when the counter result and the predetermined count number are equal, selecting a next higher or lower peak current threshold value for an inductor driver.

The third aspect can further comprise selecting a next higher or lower valley current threshold value for an inductor driver, wherein the physical vibrations of the de-coupling capacitor inductor current is outside of an audible frequency of a human due to the peak and valley threshold values of the inductor driver, wherein the de-coupling capacitor is further coupled to ground, wherein the threshold values of the selected peak/valley for the current driver increase after a certain time of a high output value of a comparison of the inductor voltage and a reference voltage has occurred, wherein the threshold values of the selected peak/valley for the current driver decrease after a certain time of a low output value of a comparison of the inductor voltage and a reference voltage has occurred, wherein a timer control resets upon a transition of the comparison, and wherein the timer is within a digital peak/valley threshold inductor controller, wherein the timer has a variable time value that is programmable.

BRIEF DESCRIPTION OF THE DRAWINGS

Reference is now made to the following descriptions.

DETAILED DESCRIPTION

Figure 1A:
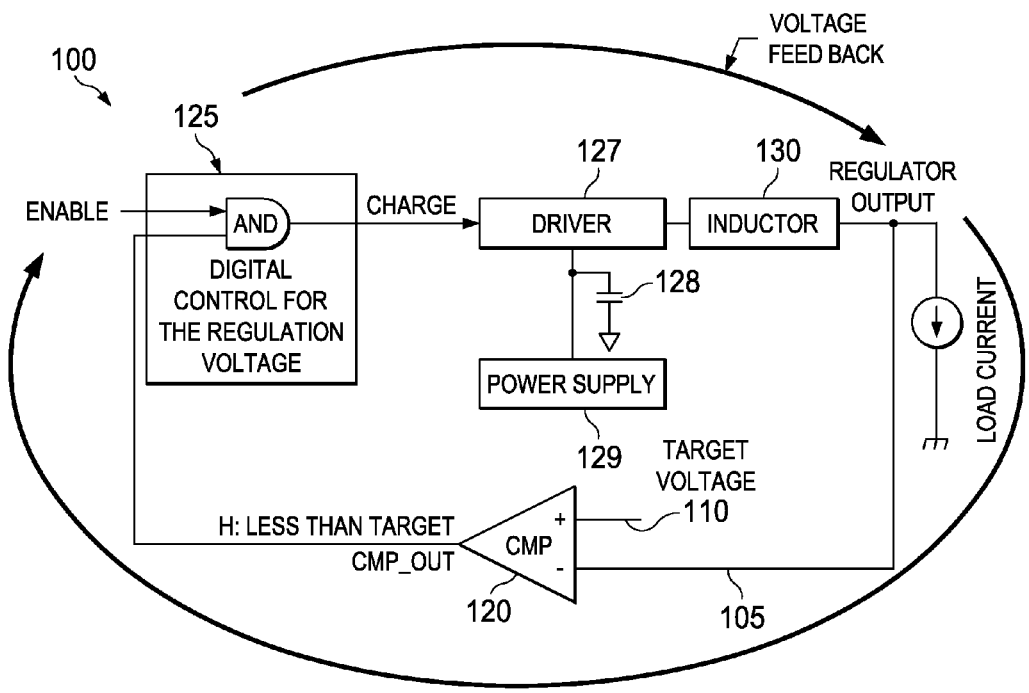
FIG. 1A illustrates a prior art switching regulator with the voltage feedback.
Figure 1B:
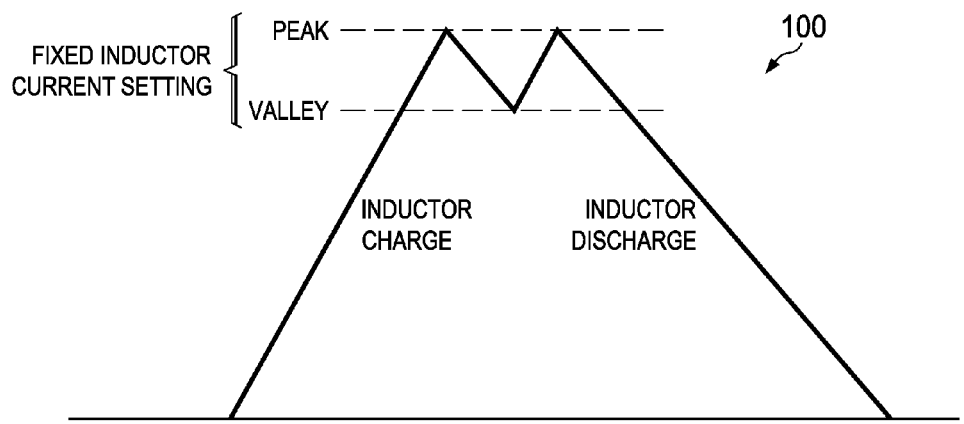
FIG. 1B illustrates a prior art switching between a peak and a valley inductor current levels in an inductor charge and inductor discharge.
Figure 2:
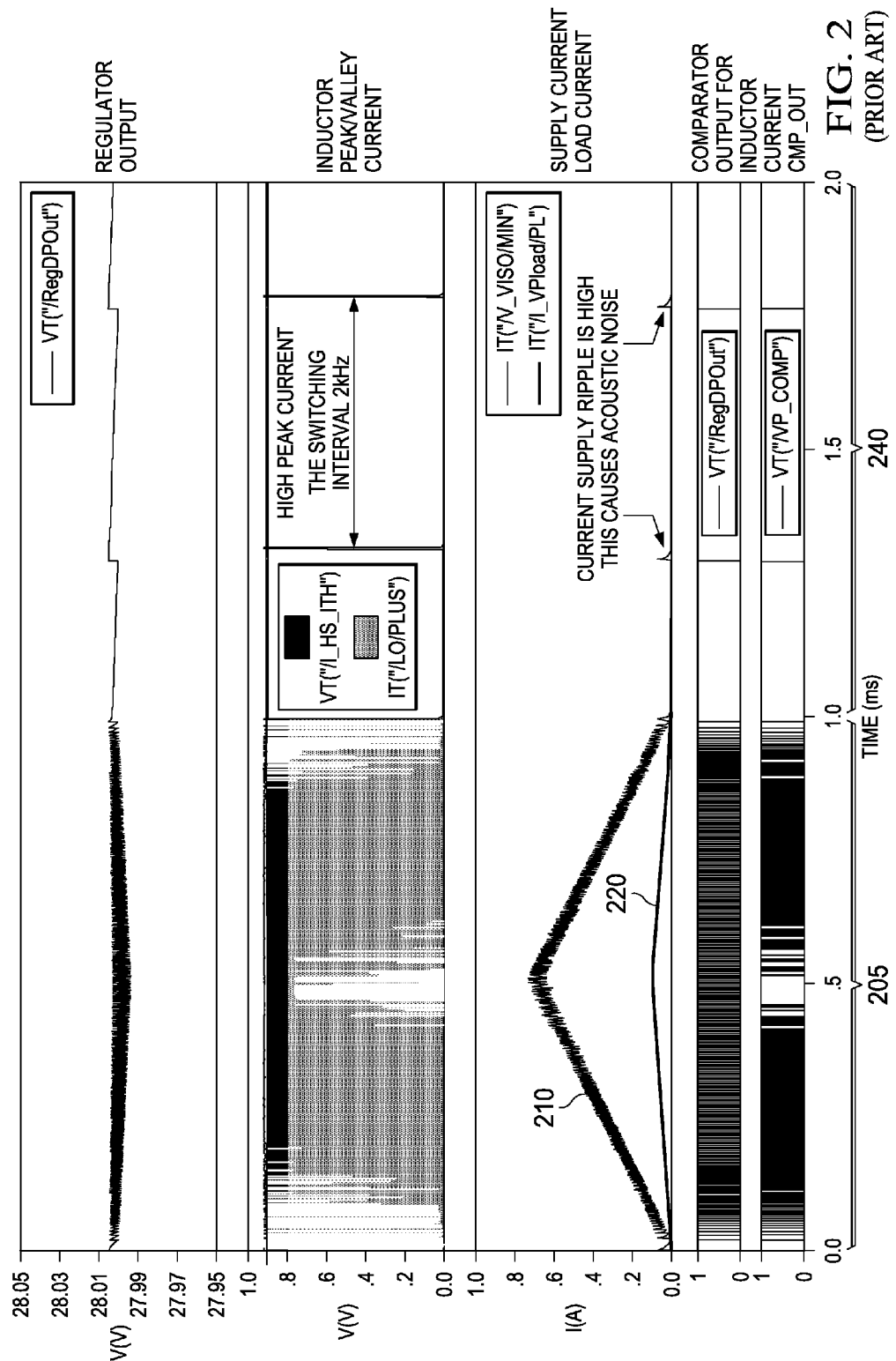
FIG. 2 illustrates a prior art boost switching regulator time domain simulation with a frequency switching interval of approximately 2 kHz when in low load current.
Figure 3:
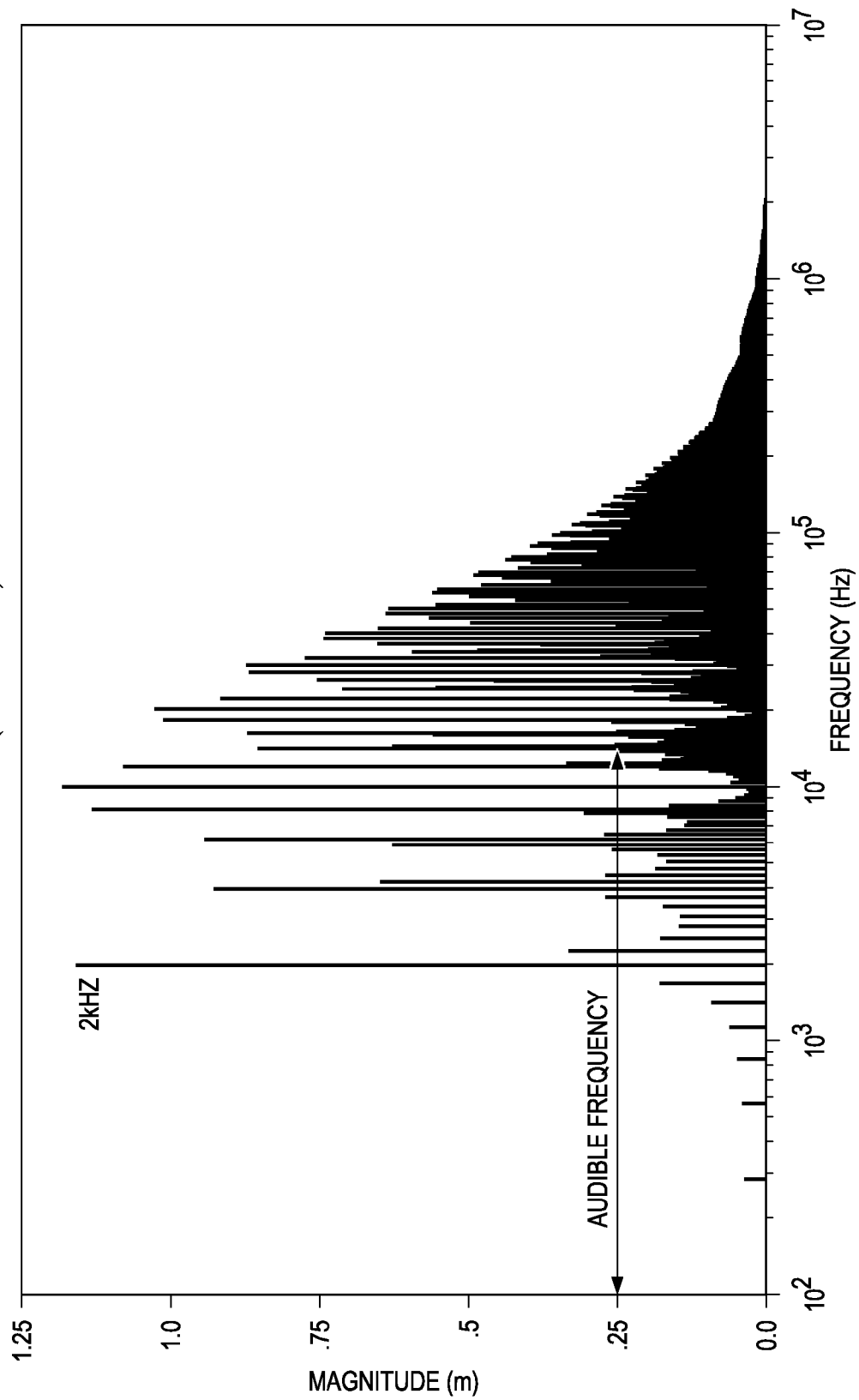
FIG. 3 illustrates a prior art frequency domain simulation of generation of audible frequencies when in low load current with use of the prior art controller of FIG. 1A.
Figure 4A:
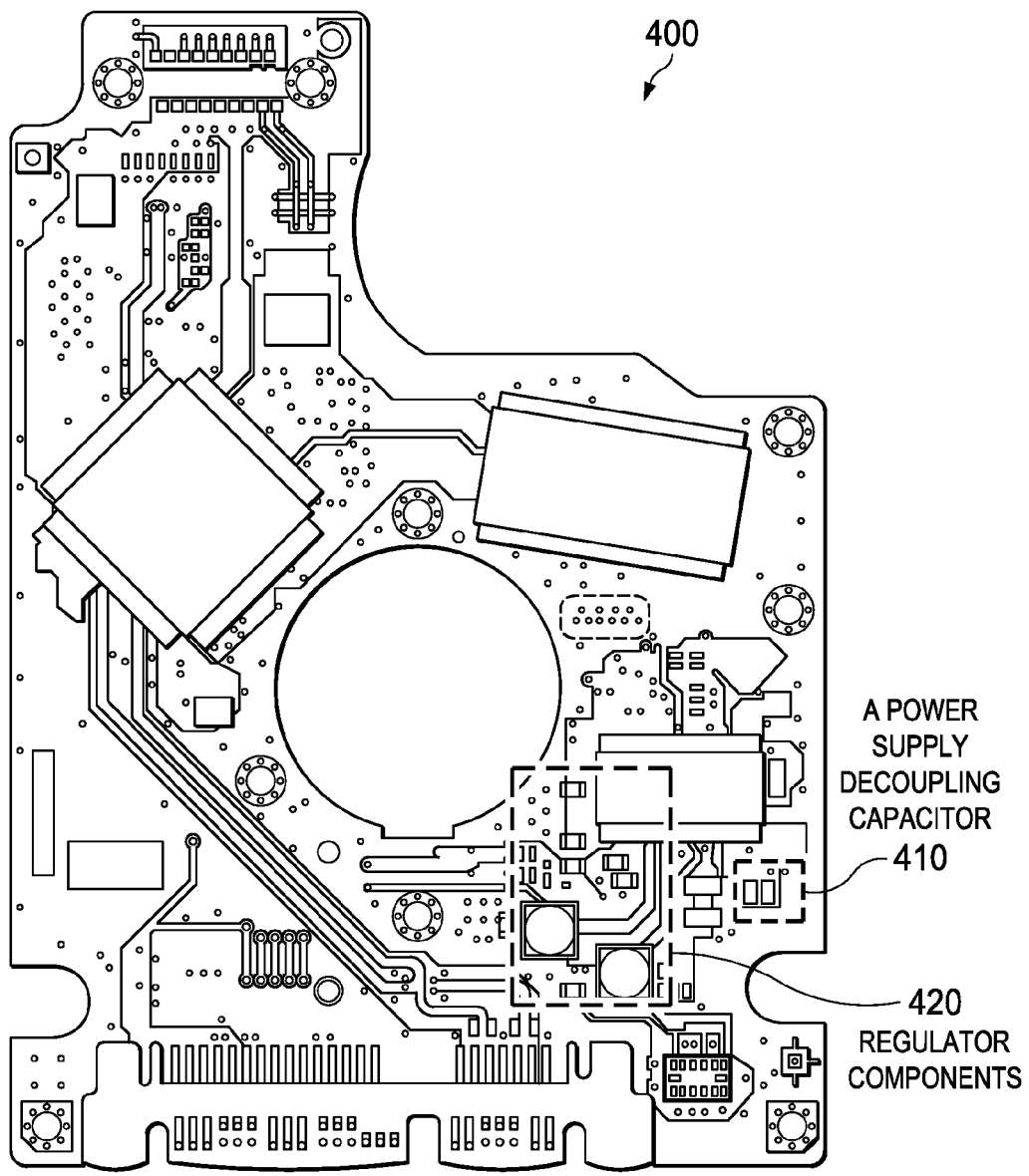
FIG. 4A illustrates a prior art printed circuit board with a power supply capacitor that can mechanically vibrate at an audible frequency.
Figure 4B:
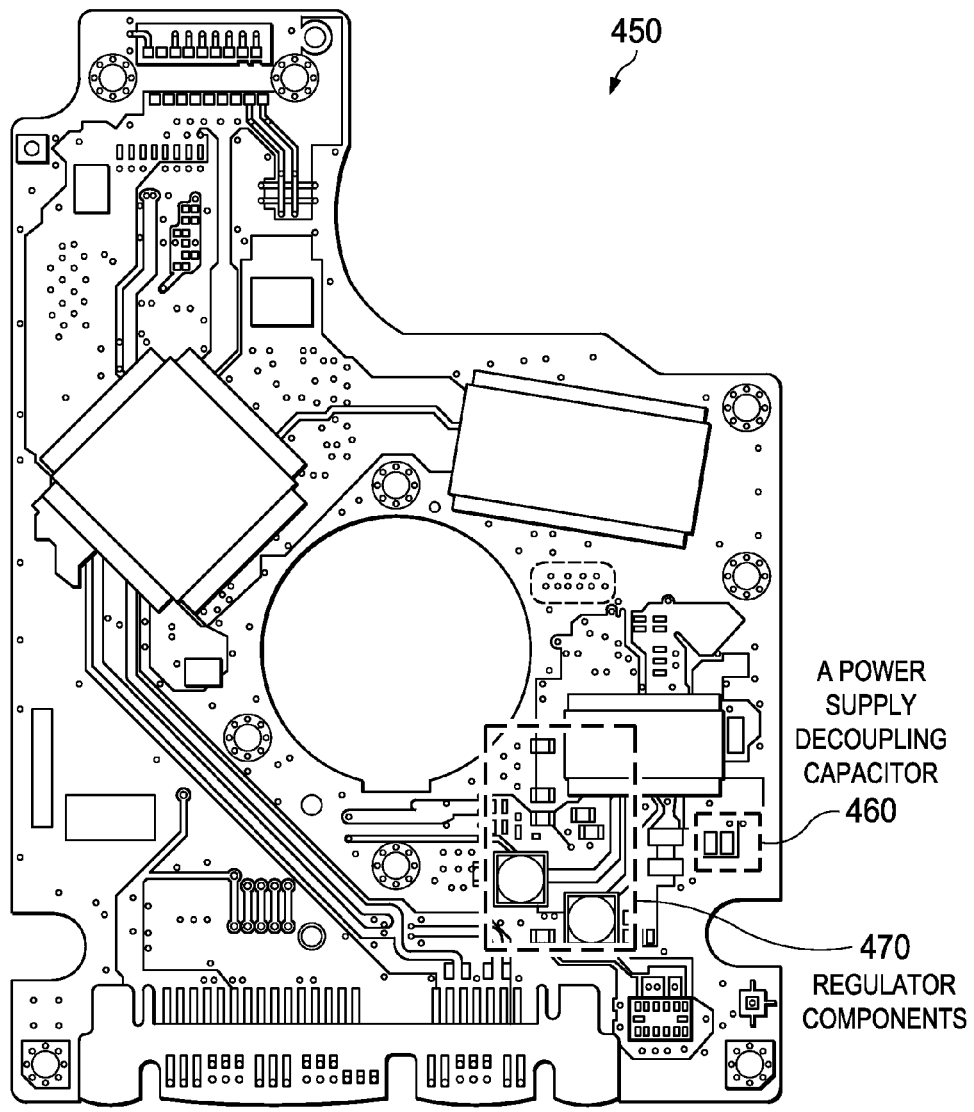
FIG. 4B illustrates a printed circuit board including a switching regulator system of FIG. 5.

FIG. 4B illustrates a printed circuit board driver 450 for a hard drive (not illustrated.) The printed circuit board driver 450 includes a power supply de-coupling capacitor 460 and regulator components 470. The principles of the present disclosure are at least generally directed towards the regulator components 470 changing a frequency of a power regulation so the power supply capacitor 460 does not vibrate in the acoustic range. This occurs through selection of different values of peak current thresholds, and can further include selections of a set of different values of peak current thresholds and valley current thresholds.

Figure 5:
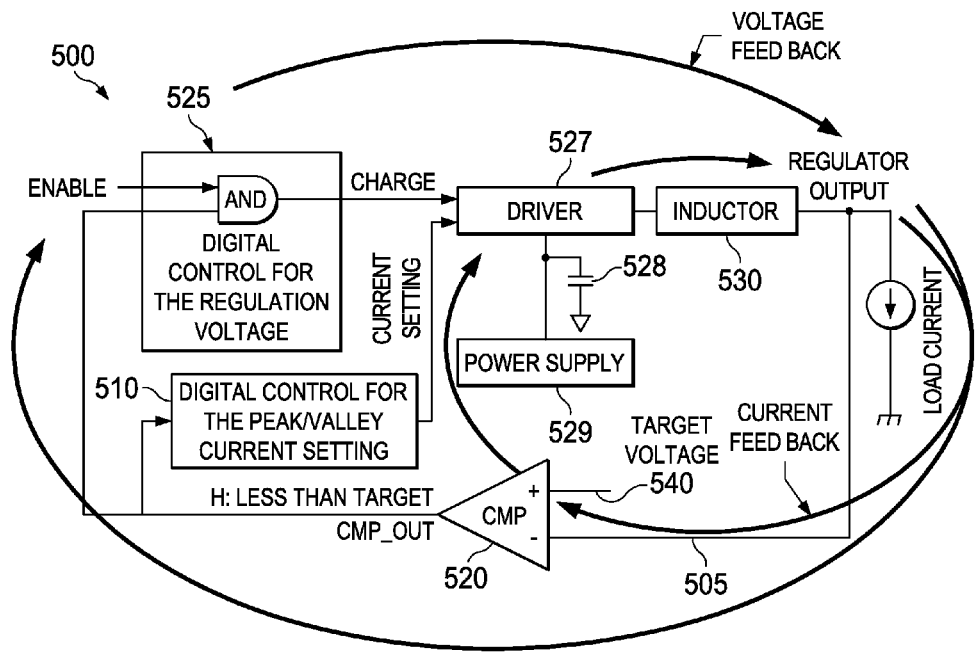
FIG. 5 illustrates a switching regulator with a current feedback loop in addition to the voltage feedback of the prior art.

FIG. 5 illustrates an example switching regulator with a voltage feedback system 500 constructed according to the principles of the present disclosure.

As is illustrated, a voltage feedback 505 of a regulator output voltage is compared with a target reference voltage 540 by a comparator 520. A voltage feedback path is used through the comparator 520 to drive an on-off digital control 525, which enables charge/discharge sequence to a current driver 527, which is coupled to an inductor 530. The inductor 530 voltage then drives the regulator output voltage.

System 500 further includes a power supply 529 coupled to the current driver 527. A de-coupling capacitor 528 is also coupled to the current driver 527, the power supply 529, and ground. The current driver 527 can be a voltage source.

The circuit 500 yet further includes a peak/valley digital control 510 which is used to control the peak and valley threshold current levels of a current driver 527. Unlike the prior art, wherein any control of threshold switching current levels of a current driver was outside of a control loop of the regulator, in the system 500 control of the threshold switching current levels of the driver 527 occurs as a result of a control loop of the current driver 527.

The peak/valley digital control 510 selects one of a set of current peak/valley thresholds for the driver 527. Although typically the distance between the peak threshold and the valley threshold remains the same between sets and within a set, the value of the peak threshold is adjustable, and can be set at a lower magnitude than in the prior art. Moreover, in further embodiments, the value of the valley threshold is also adjustable.

The peak/valley digital control 510 monitors a duration or durations of high or low state logic outputs of the comparator 520. A voltage output value of "high" from the comparator 520 indicates that the regulator output is less than the target voltage. A voltage output value of "low" of the comparator 520 indicates that the regulator output voltage exceeds the target voltage, and hence, the driver 527 stops driving the inductor 530.

In the peak/valley digital control 510, when the duration of the comparator 520 output stays high for a pre-determined time, the inductor peak/valley current is controlled to set the peak and valley current thresholds of the current driver 527 as higher than its previous setting. In a similar way, when the duration of the comparator 520 output stays low for a pre-determined time, the inductor peak/valley current is controlled to set the peak and valley current thresholds of the current driver 527 as lower than its previous setting.

Figure 6:
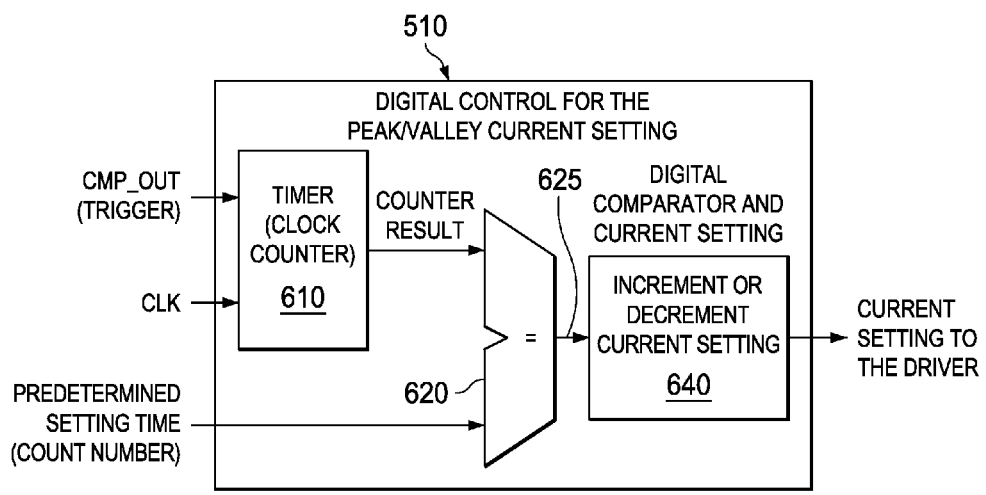
FIG. 6 illustrates an example peak/valley threshold digital controller of FIG. 5.

FIG. 6 illustrates the peak/valley current setting digital controller 510. In a timer 610 of the peak/valley controller 510, a clock signal is received. The timer 610 also receives an input from the comparator 520, and monitors for a high to low or low to high signal transition.

Upon receiving such a transition, the timer resets to zero, and measures time's passage. The timer 610 is continuously outputting an elapsed time value since the last transition according to the number of received clock cycles.

A predetermined count number, which represents a count of the number of allowable elapsed received clock cycles before selecting a new set of peak and valley current thresholds for the current inductor, and the timer 610 output are received by a digital comparator 620. An output 625 of the digital comparator 620 is then conveyed to the increment or decrement current setting circuit 640.

The increment or decrement current setting circuit 640 selects a new set of peak and valley threshold values that are either incremented or decremented.

An output of the increment/decrement current setting circuit 640 is then conveyed to the driver 527 (not illustrated). The increment/decrement current setting circuit 640 is used to select one set of a plurality of sets of peak and valley current values of the current driver 527, as will be illustrated in more detail in FIGS. 8 and 9 below.

The increment or decrement current setting 640 can also reset the timer 610 upon receiving a comparison="true" value.

Figure 7:
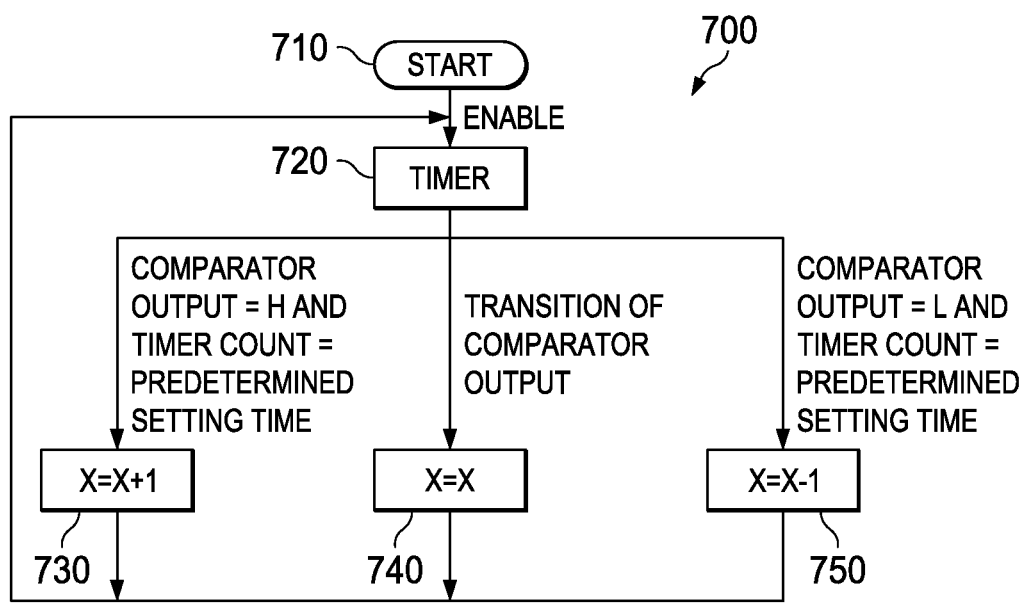
FIG. 7 illustrates a state machine of a transition and selection of inductor current through digital control of the peak/valley current settings of FIG. 5.

FIG. 7 illustrates an example state machine 700 embodied within the peak/valley controller 510.

In the state machine 700, the peak/valley current setting is determined as follows: after a start step 710, which is triggered by a transition of the signal CMP_OUT in FIG. 5 and FIG. 6, a clock count timer 720 starts monitoring the CLK signal, as is discussed in FIG. 6.

If the comparator 520 output keeps high longer in time length than the predetermined time, then the state goes into a circuit 730, which the peak/valley current setting X1 is set 1 step higher than the present setting (X2=X1+1). Therefore, a new set of higher peak and valley threshold values are selected. After the setting X1 is incremented by 1, the state goes back to the state 720.

In a similar way, if the comparator 520 output keeps low longer in time length than the predetermined time, then the state machine 700 goes into a state 750, in which the peak/valley current setting X1 is set 1 step lower than the present setting (X2=X1−1). Therefore, a new set of lower peak and valley threshold values are selected. After the setting X1 is decremented by 1, the state goes back to the circuit 720.

On the other hand, if the comparator 520 output only stays high or low for a length of time that is shorter than the predetermined time, then the state machine 700 goes into a state 740, at which the peak/valley current setting X1 is kept the same (X2=X1). After transitioning to the state 740, the timer count is once reset and goes back into the state 720 to re-start the timer sequence.

Figure 8:
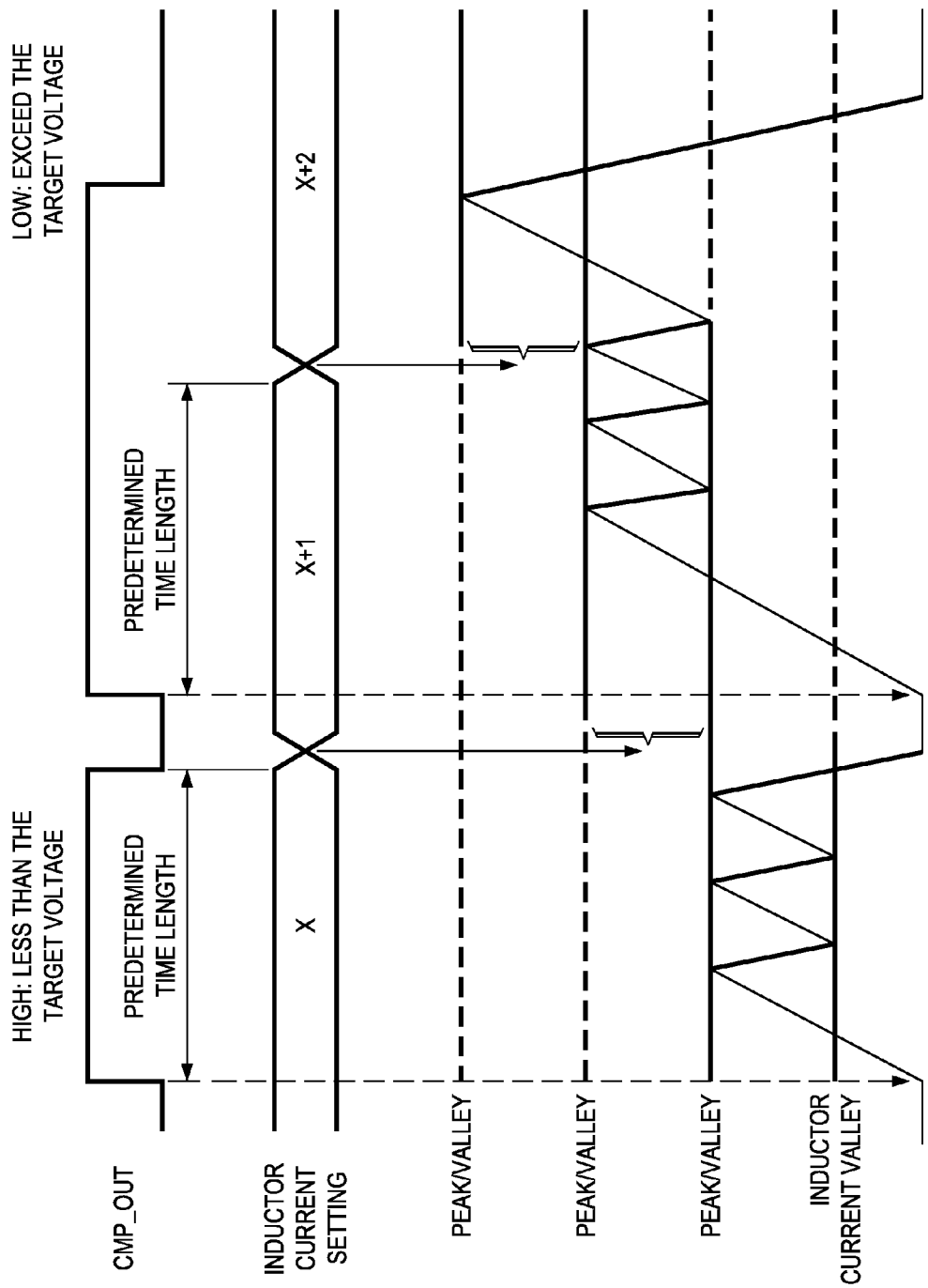
FIG. 8 illustrates an example of an increase sequence of peak/valley current due to the result of a high comparator output.

FIG. 8 illustrates a behavior of the current of the inductor 530, wherein the amplitudes of the current are controlled by the peak/valley digital controller 510, where the peak/valley current setting gradually increases as illustrated by X, X+1, and X+2. The sets of peak/valley thresholds of the circuit 510 are conveyed to the driver 527, a first set as X, a second set as X+1, a third set as X+2, and the driver 527 threshold current values are thereby modified.

Figure 9:
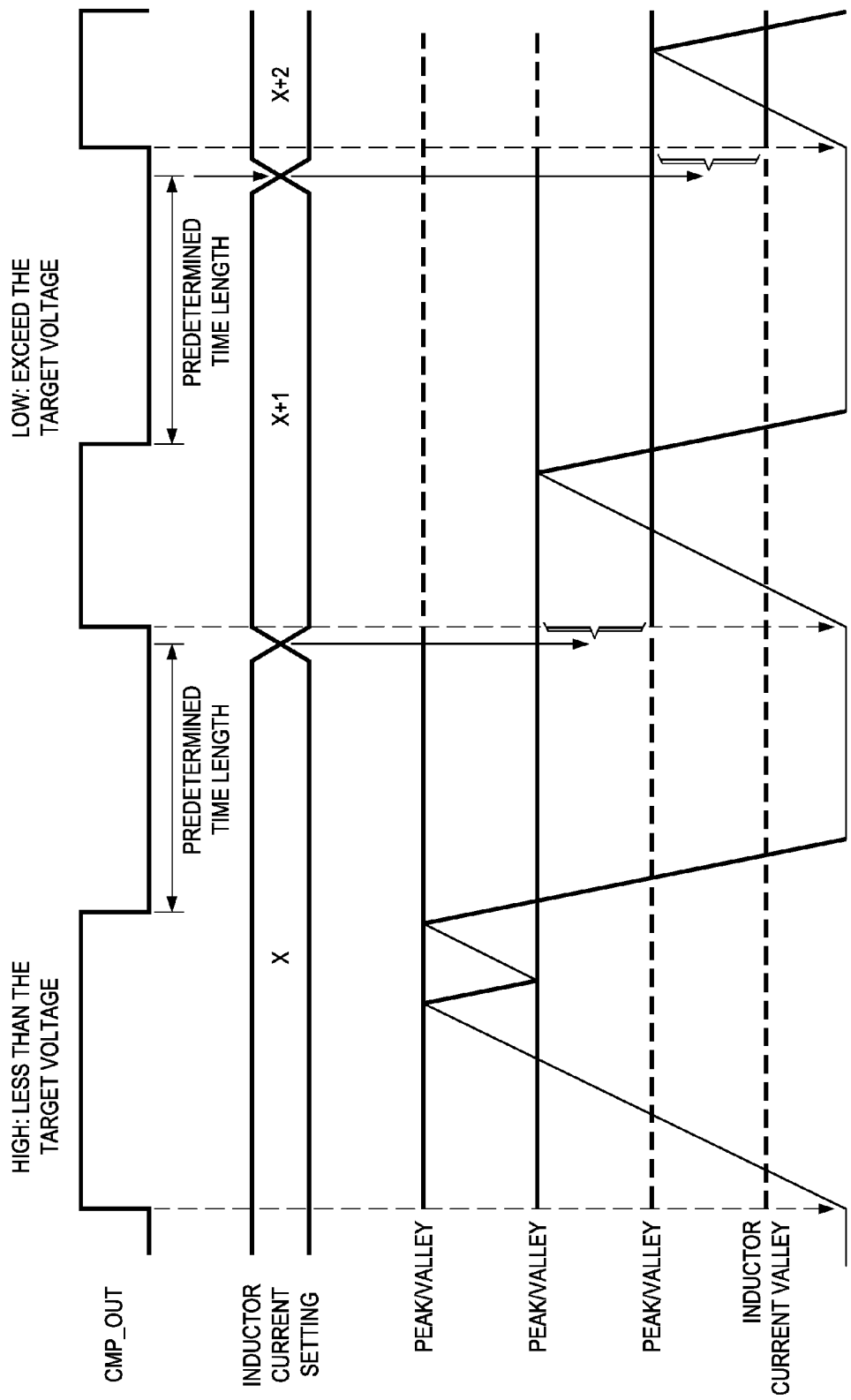
FIG. 9 illustrates an example of a decrease sequence of peak/valley current due to the result of a low comparator output.

FIG. 9 illustrates a behavior of the current of the inductor 530, wherein the amplitudes of the current are again controlled by the peak/valley digital controller 510, where the peak/valley current setting gradually decreases as illustrated by X, X−1, and X−2. The sets of peak/valley thresholds of the circuit 510 are conveyed to the driver 527, a first set as X, a second set as X−1, a third set as X−2, and the driver 527 threshold current values are thereby modified.

Figure 10:
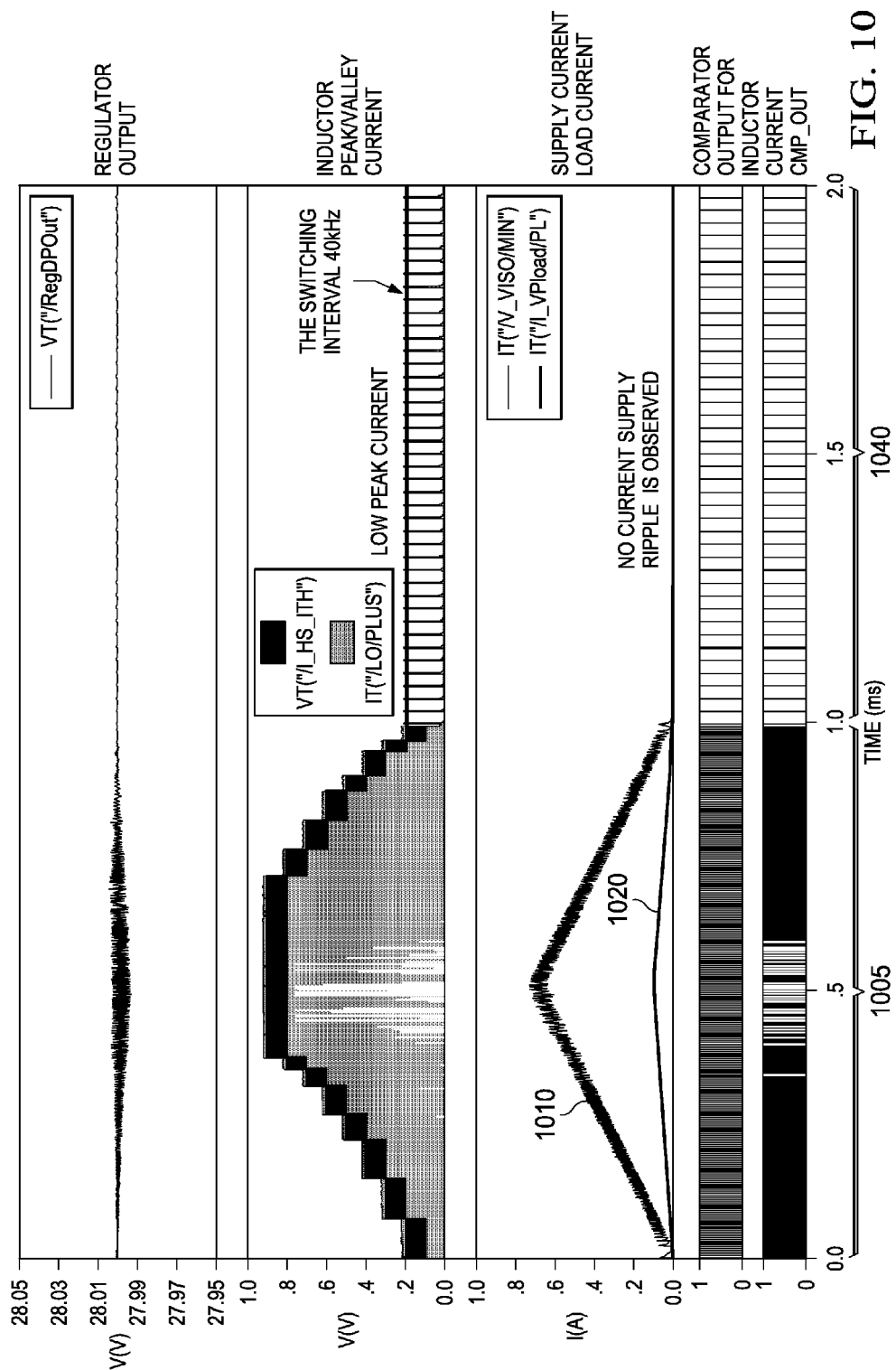
FIG. 10 illustrates a boost switching regulator transient simulation with a frequency switching interval of approximately 40 kHz when supplying a low load current.

FIG. 10 illustrates a transient simulation results on the system 500 of FIG. 5.

The load current is gradually swept in 1010, and swept down in 1020 of the graph 1005. As is illustrated, the inductor peak/valley current is automatically controlled along with the change of the regulator load current in the graph 1005.

The load current is consistently low in 1040. As is illustrated, when the load current is low, the magnitude of the supply current amplitude change is smaller than that of the prior art. In general, a lower absolute value of the peak threshold results in less energy spectrally radiated.

The switching cycle of the regulator 500 is also higher than that of prior art. Therefore, the vibration frequency of the power supply de-coupling capacitor 460 can be as high as approximately 40 kHz under simulation conditions.

Figure 11:
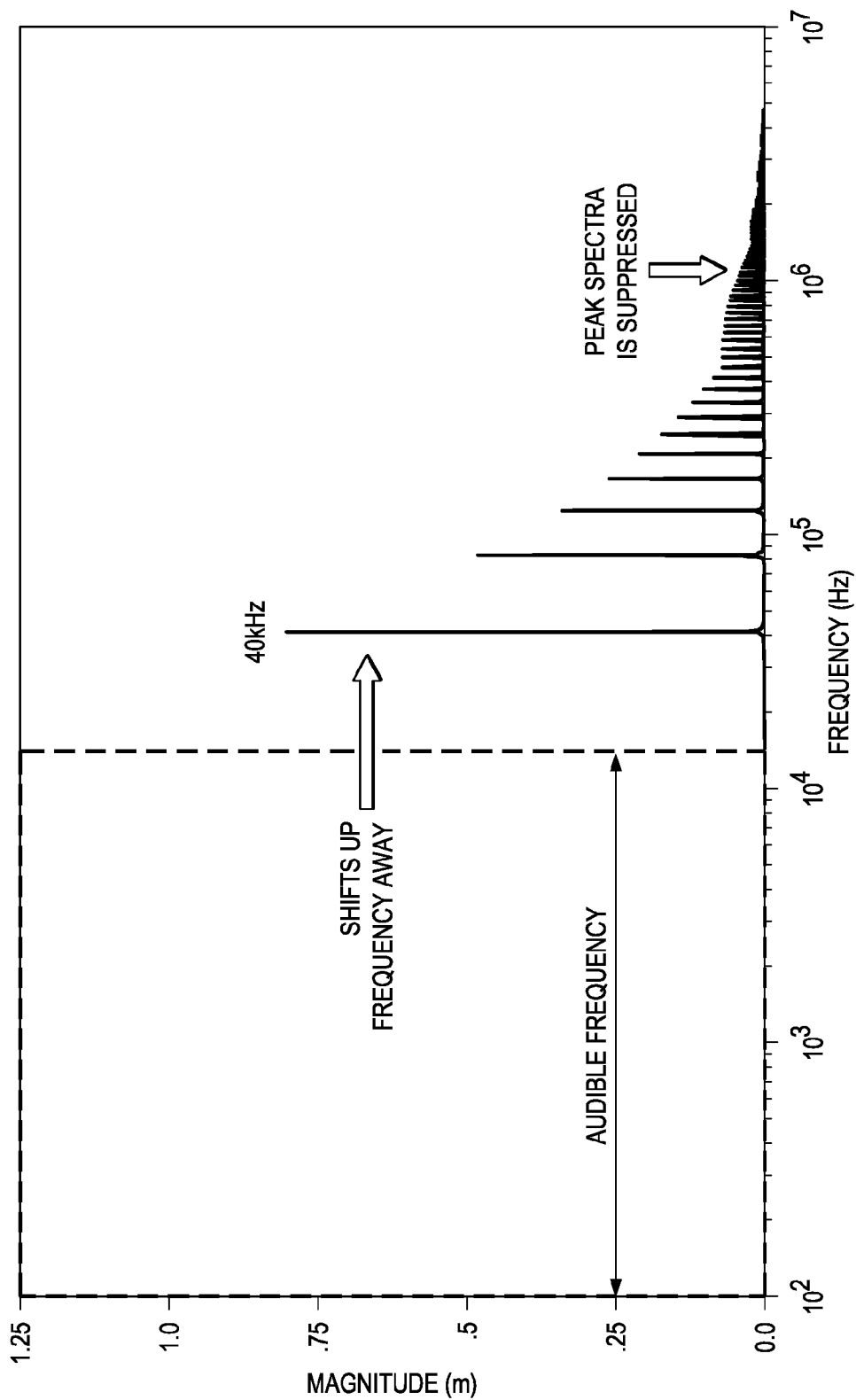
FIG. 11 illustrates an example of a frequency spectrum generated by the system of FIG. 5 when in low load current.

FIG. 11 illustrates an example frequency response simulation result of circuit 500. As is illustrated, the spectrum of the power supply current is modified and shifted into a higher frequency range, which is not an audible range. In addition, the peaks of a spectrum in the high frequency range are suppressed because the peak inductor current has been limited by the lower peak thresholds of the circuit 500. The effect of the circuit 500 is a system with low mechanical noise at the audible frequency range.

In further embodiments, the regulator 500 can be used with many kinds of switching regulators, such as buck converters, boost converters, and buck-boost regulator, which may have a concern with mechanical resonance and the noise.

Those skilled in the art to which this application relates will appreciate that other and further additions, deletions, substitutions and modifications may be made to the described embodiments.

What is claimed is:
1. A switching regulator circuit comprising:
an inductor having an input and a regulator output;

driver circuitry having a driver output directly connected to the input of the inductor, a power supply input, a charge input, and a current setting input;

a power supply having a power supply output directly connected to the power supply input;

a decoupling capacitor directly connected to the power supply output;

charge and discharge circuitry having a charge output directly connected to the charge input, an enable input, and a first comparator input;

comparator circuitry having a first comparator output directly connected to the first comparator input, a target voltage input, and a regulator input coupled to the regulator output; and peak and valley control circuitry having a second comparator input directly connected to the first comparator output and a current setting output directly connected to the current setting input, the peak and valley control circuitry including clock counter circuitry having a trigger input connected to the second comparator input of the peak and valley control circuitry, a clock input, and a clock count output coupled to the current setting output.

2. The circuit of claim 1 in which the peak and valley control circuitry includes digital comparator circuitry having a clock count input connected to the clock count output, a count number input, and an increment and decrement output connected to the current setting output.

3. The circuit of claim 1 in which the peak and valley control circuitry includes digital comparator circuitry having a counter result input coupled to the comparator input of the peak and valley control circuitry, a count number input, and an increment and decrement output coupled to the current setting output.

4. The circuit of claim 1 in which the peak and valley control circuitry includes current setting circuitry having an increment and decrement input coupled to the comparator input of the peak and valley control circuitry, and an output coupled to the current setting output.

5. The circuit of claim 1 in which the peak and valley control circuitry includes:

digital comparator circuitry having a clock count input coupled to the clock count output, a count number input, and an increment and decrement output; and current setting circuitry having an increment and decrement input coupled to the increment and decrement output and an output coupled to the current setting output.

* * * * *